(12) United States Patent
Ahn et al.

(10) Patent No.: US 6,980,351 B2
(45) Date of Patent: Dec. 27, 2005

(54) ELECTROPHORETIC DISPLAY

(75) Inventors: Seong-Deok Ahn, Daejeon (KR); Yong Eui Lee, Daejeon (KR); Seung-Youl Kang, Daejeon (KR); Kyung-Soo Suh, Daejeon (KR)

(73) Assignee: Electronics and Telecommunications Research Institute, (KR)

( * ) Notice: Subject to any disclaimer, the term of this patent is extended or adjusted under 35 U.S.C. 154(b) by 0 days.

(21) Appl. No.: 10/334,409

(22) Filed: Dec. 31, 2002

(65) Prior Publication Data
US 2004/0027642 A1   Feb. 12, 2004

(30) Foreign Application Priority Data
Aug. 9, 2002 (KR) .................. 10-2002-0047195

(51) Int. Cl.[7] .............................................. G02B 26/00
(52) U.S. Cl. .................. 359/296; 359/242; 359/252
(58) Field of Search ................ 359/252, 452, 359/296, 253, 242–3, 240, 321, 254; 345/105, 345/107–8, 84, 111, 11; 204/478, 485, 290.07; 252/583, 600; 428/426

(56) References Cited

U.S. PATENT DOCUMENTS

| | | | | |
|---|---|---|---|---|
| 5,914,805 A | * | 6/1999 | Crowley | 359/296 |
| 5,961,804 A | * | 10/1999 | Jacobson et al. | 204/606 |
| 6,577,433 B1 | * | 6/2003 | Lin et al. | 359/296 |
| 2003/0214697 A1 | * | 11/2003 | Duthaler et al. | 359/296 |

\* cited by examiner

*Primary Examiner*—Jordan M. Schwartz
*Assistant Examiner*—Jessica Stultz
(74) *Attorney, Agent, or Firm*—Blakely, Sokoloff, Taylor & Zafman

(57) ABSTRACT

An electrophoretic display utilizing a phenomenon of electrophoresis is provided. The electrophoretic display includes an lower electrode located on an under layer, an lower electrode protection layer formed on the lower electrode, a plurality of microcapsules located on the lower electrode protection layer, coated or encapsulated in a micro size and not operating in an electric field, a particle and/or a fluid included within the microcapsule and having a single visual color, a charged particle existed among the plurality of microcapsules, having different visual colors, operating according to an electric field and suspended in a dielectric fluid, and an upper electrode protection layer and an upper electrode located on the plurality of microcapsule in sequential order. Accordingly, a reliable electrophoretic display with one color or natural colors is achieved.

15 Claims, 7 Drawing Sheets

ELECTROPHORETIC DISPLAY

BACKGROUND OF THE INVENTION

1. Field of the Invention

The present invention relates to displays, particularly electrophoretic displays (electronic papers), and to new structures useful in such displays.

2. Description of the Related Art

An electrophoretic display (electronic paper) which utilizes the phenomenon of electrophoresis to achieve contrast is an electronic-indicated display using movement of a charged particle in an applied electric field. It is possible to apply the electrophoretic display to displays such as electronic books, electronic dailies, electronic magazines, electronic publications, and information displaying media of mobile communication devices.

Electrophoresis refers to movement of charged particles in an applied electric field. When an electrophoresis occurs in a fluid, the charged particles move with a velocity determined primarily by the viscous drag of the particles, their charge, the dielectric properties of the fluid, and the magnitude of the applied electric field.

An electrophoretic display utilizes charged particles of one color suspended in a dielectric fluid medium of a different color to achieve contrast. In other words, when the electrodes are operated to apply an electric field across the medium, charged particles having opposite sign to each other migrate toward the electrode of opposite sign, respectively. The result is a visually observable color change.

Useful electrophoretic displays are bistable, their state persists even after the activating electric field is removed. Unfortunately, the stability of current electrophoretic displays is limited. Although flocculation or settling of particles can be avoided by matching the density of the particles with that of the fluid medium, long-term particle agglomeration remains a problem. Moreover, the problem becomes even worse when two particles of having different color and opposite sign to each other migrate by the electrophoresis phenomenon, which deteriorates the displays.

To solve the problems described above, E-Ink Corporation in the U.S.A has suggested electrophoretic displays are based on microcapsules each having therein an electrophoretic elements of a dielectric fluid and a suspension of particles that visually contrast with the dielectric fluid and also exhibit surface charges. The successful construction of an electrophoretic display requires the proper interaction of several different types of materials and processes. Materials such as a polymeric binder, a capsule membrane, and the electrophoretic particles and fluid must all be chemically compatible.

FIGS. 1A and 1B are sections of a conventional electrophoretic display.

FIG. 1A illustrates an encapsulated electrophoretic display when an electric field is not applied. In the electrophoretic display, a lower electrode 13 and a lower electrode protection layer 15 are formed on an under layer 11 that may be transparent or opaque. A microcapsule 17 is formed on the lower electrode protection layer 15. The microcapsule 17 comprises a transparent fluid 19, a white particle of positive charge 21, and a black particle of negative charge 23. The lower electrode protection layer 15 has functions of protecting the lower electrode 13 and separating the lower electrode 13 from the microcapsule 17. An upper electrode 25 is located on the microcapsule 17. A transparent upper layer 27 is formed on the upper electrode 25.

FIG. 1B illustrates an encapsulated electrophoretic display when an electric field is applied. When an electric field is applied between a lower electrode 13 and an upper electrode 25, the particles of positive charge 21 and negative charge 23 within the microcapsule 17 migrate toward an electrode of opposite sign. The migration of the charged particles causes a visually observable color change.

However, in the prior art, when two charged particles of different colors exist within the microcapsule 17, the electrophretic display has to keep the same specific gravities between two charged particles of different colors and a dielectric fluid, and also needs a chemical treatment to prevent between two charged particles from agglomerating. Such a chemical treatment is very difficult to handle since the difference in the specific gravities of the charged particles and the dielectric fluid causes floating or sediment of the charged particles in a specific time or the agglomeration or clustering of the charged particles, and eventually leads to a deterioration of a display.

Another problem of conventional electrophoretic display having two charged particles is the difference in a size and a charge quantity of two charged particles causes the difference in the response (switching) time between two charged particles.

SUMMARY OF THE INVENTION

To solve the above-described and related problems, it is an object of the present invention to provide an electrophoretic display capable of equalizing a specific gravity of two charge particles with a specific gravity of a dielectric fluid, preventing agglomerating or clustering between two charged particles, and solving the problem of difference in the response time between tow charged particles.

In an aspect, the present invention provides an electrophoretic display in which a lower electrode is located on an upper layer and a lower electrode protection layer is formed on a lower electrode. A plurality of microcapsules, coated or encapsulated in a micro size and which do not operate in an electric field, are formed on the lower electrode protection layer. A plurality of particles and/or a fluid within the microcapsules having only one color. The charged particles of different color among the microcapsules operate according to an applied electric field, and are suspended in the dielectric fluid. An upper electrode protection layer and an upper electrode are located on the microcapsule in sequential order.

The charged particles can be composed of particles visually absorbing or reflecting lights. The fluid or the particle within a microcapsule can be also composed of substances visually absorbing or scattering lights. The charged particles can be composed of substances having the same specific gravity as the specific gravity of the dielectric fluid. The lower electrode and the upper electrode can be made in a pixel type according to a microcapsule.

The particle within a microcapsule can be a plurality of particles, be much smaller than the microcapsule and reflect lights visually. The particle within the microcapsules can be nearly the same size as the microcapsule and scatter lights visually.

A plurality of particles can be further formed on the microcapsule and scatter lights visually. The particles can be comprised of a plurality of particles of red, green, and blue, and achieve natural colors by scattering a specific color.

Also, fluid or particle within the microcapsule can be red, green, and blue and achieve natural colors by scattering a specific color.

A particle within the microcapsule can be plural, be smaller than the microcapsule and absorb lights visually. The particle within the microcapsule can be the nearly same size as the microcapsule and absorb lights visually. A plurality of particles can be further formed on the microcapsule and absorb lights visually.

As described above, the electrophoretic display according to the present invention is composed of a microcapsule which has one color and does not move in an electric field, and a particle which has a different color and moves according to the electric field. Thus, the electrophoretic display according to the present invention can achieve reliable one color or natural colors.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1A:
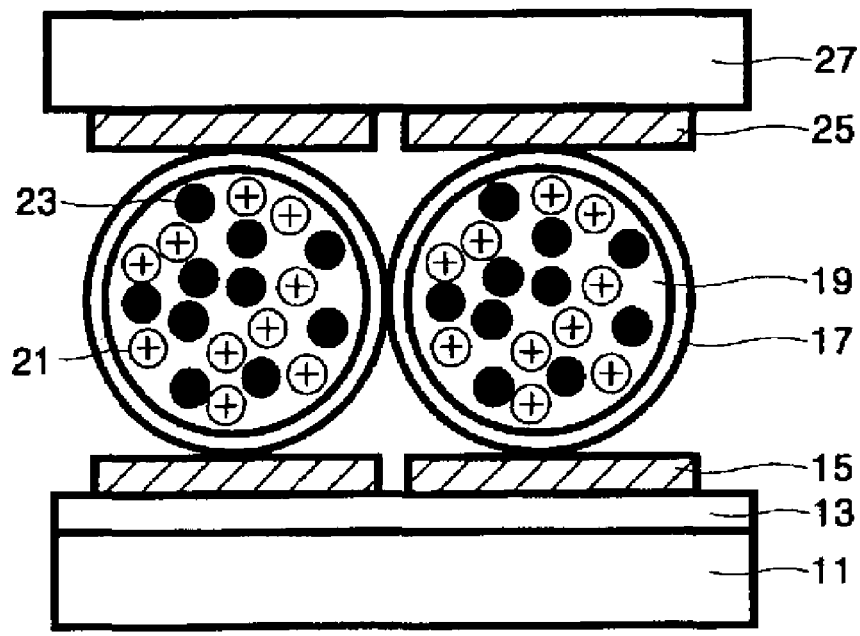
FIGS. 1A and 1B are sections of a conventional electrophoretic display.
Figure 1B:
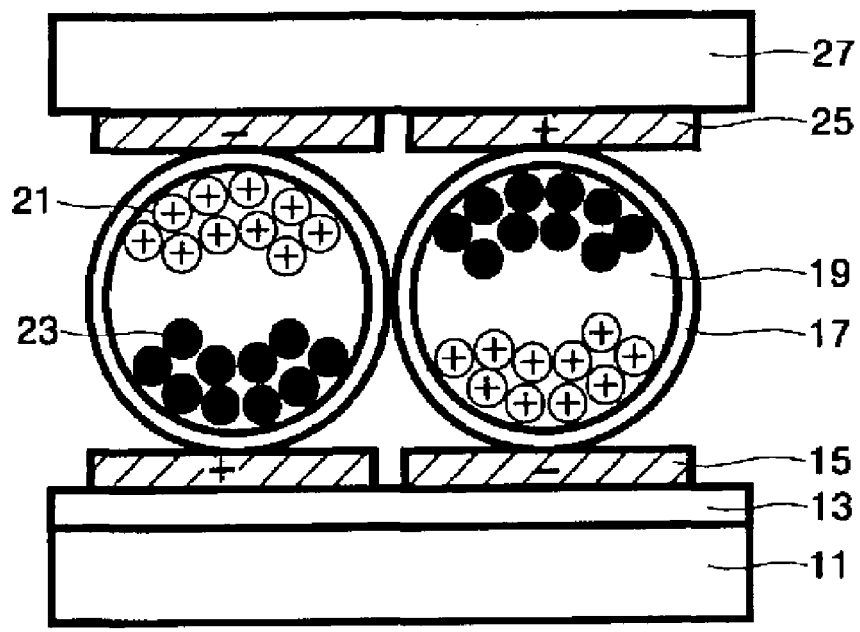
Figure 2A:
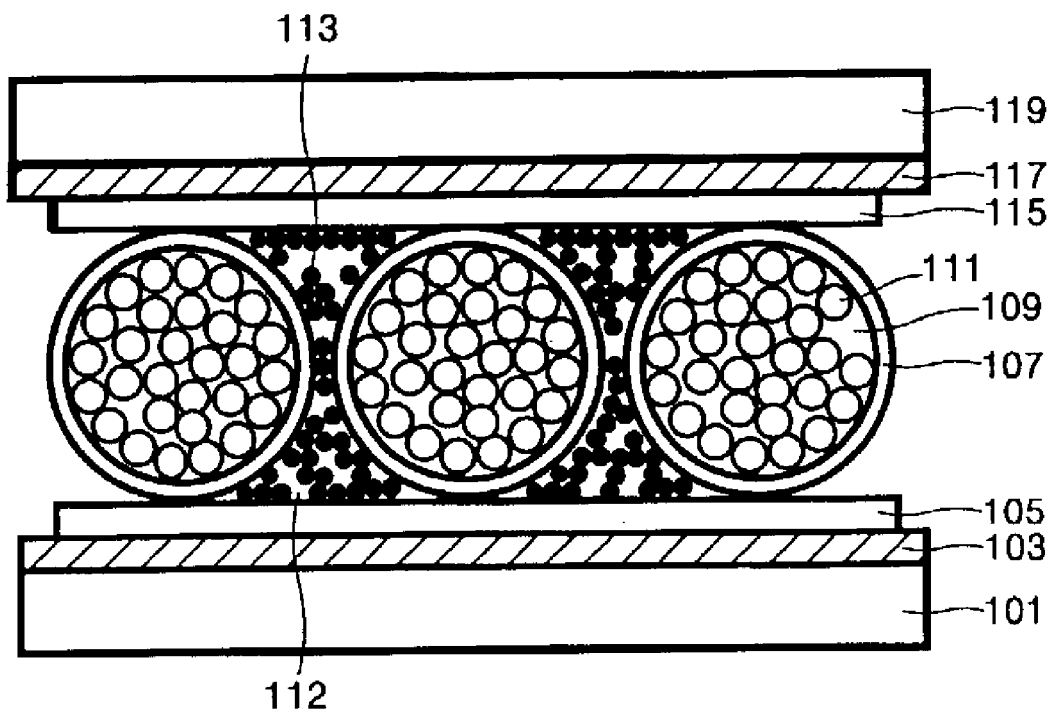
FIGS. 2A to 2C are sections of an electophoretic display according to a preferred embodiment of the present invention.
Figure 2B:
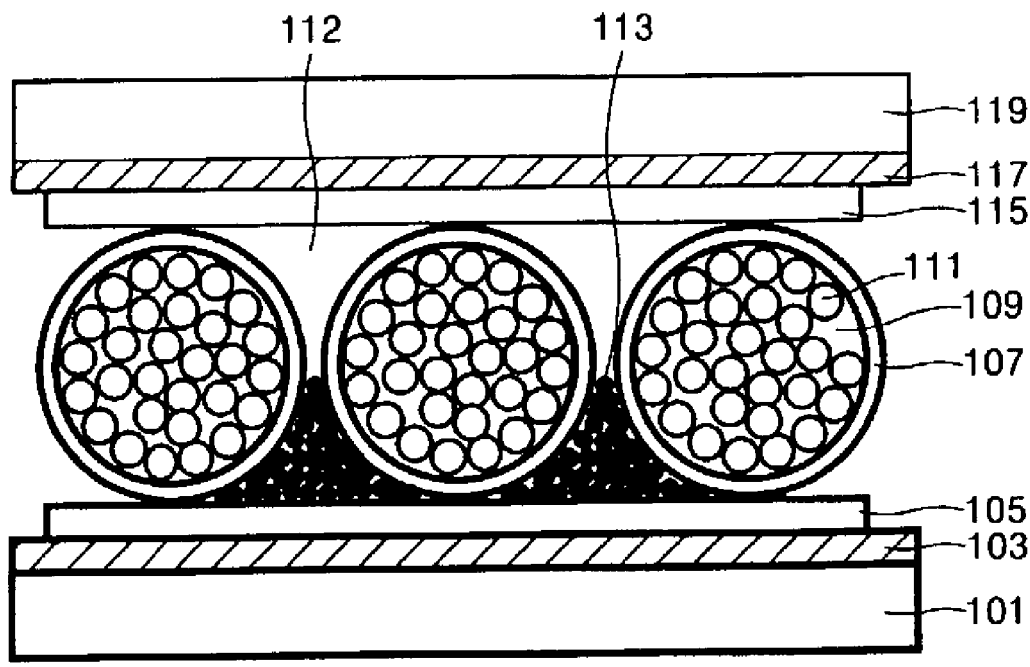
Figure 2C:
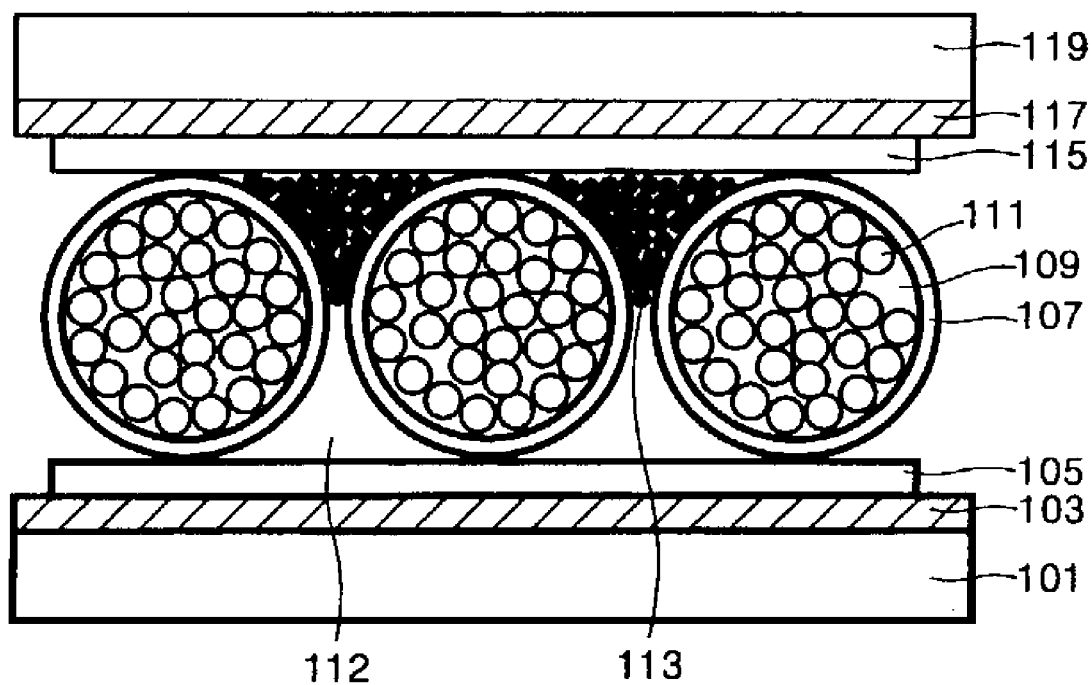

FIGS. 2A to 2C are sections of an electrophoretic display according to an embodiment of the present invention.

FIG. 2A illustrates an electrophoretic display according to one embodiment of the present invention when an electric field is not applied. A lower electrode 103 and an lower electrode protection layer 105 are formed on an under layer 101. A plurality of microcapsules 107, coated or encapsulated in a micro size and which do not operate in an electric field, are formed on the lower electrode protection layer 105.

A transparent fluid 109 and a particle 111 of one color are included within a microcapsule 107. A particle 111 is made of a plurality of particles and is much smaller than the microcapsule 107. The transparent fluid 109 and/or the particle 111 are composed of substances visually scattering or absorbing lights. The lower electrode protection layer 105 has functions of protecting the lower electrode 103, separating the lower electrode 103 from the microcapsule 107, and preventing the charged particles from sticking to the lower electrode 103.

A dielectric fluid 112 and a charged particle 113 exist among the microcapsules 107 and a charged particle 113 is suspended in the dielectric fluid 112 in which the charged particle 113 has a different color and operates according to the electric field. The charged particle 113 is composed of particles absorbing or scattering lights. The charged particle 113 may be comprised of substances having the same specific gravity as a specific gravity of the dielectric fluid 112.

In addition, an upper electrode protection layer 115 and an upper electrode 117 are located on the microcapsules 107 in sequential order. When an electric field is applied between a lower electrode 103 and an upper electrode 117, the charged particles 113 migrate toward an electrode of opposite sign. The upper electrode protection layer 115 has functions of protecting the upper electrode 117, separating the upper electrode 117 from the microcapsule 107, and preventing the charged particles from sticking to the electrode. A transparent upper layer 119 is formed on the upper electrode 117.

FIGS. 2B and 2C illustrate an electrophoretic display according to one embodiment of the present invention when an electric field is applied. The charged particles 113 among the microcapsules 107 migrate toward electrodes of opposite sign, thereby producing a visually observable color change. FIG. 2B shows a migration of the charged particles 113 of micro size toward the lower electrode 103, while FIG. 2C shows a migration of the charged particles 113 of micro size toward the upper electrode 117.

Also, the electrophoretic display according to one embodiment of the present invention produces natural colors. In other words, the natural colors are achieved by having a particle of a single visual color 111 within the microcapsule 107 comprised of red, green, and blue particles, and making the particle scatter or absorb a specific color.

Figure 3A:
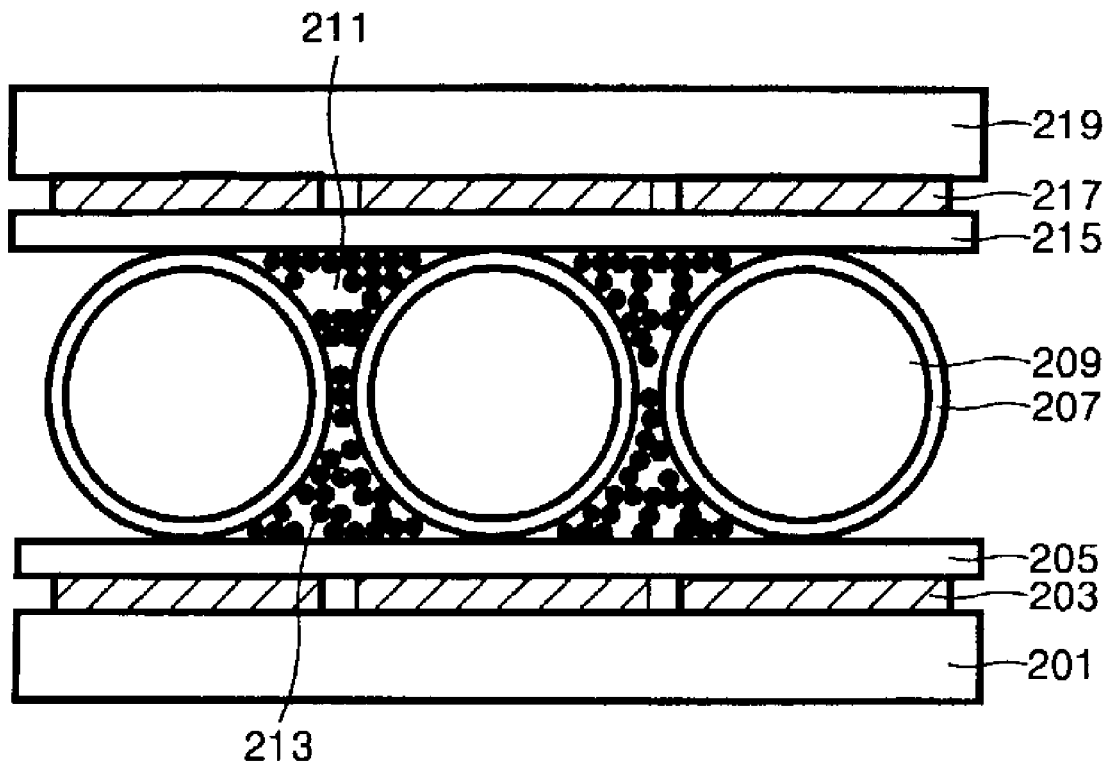
FIGS. 3A to 3C are sections of an electrophoretic display according to a preferred embodiment of the present invention.
Figure 3B:
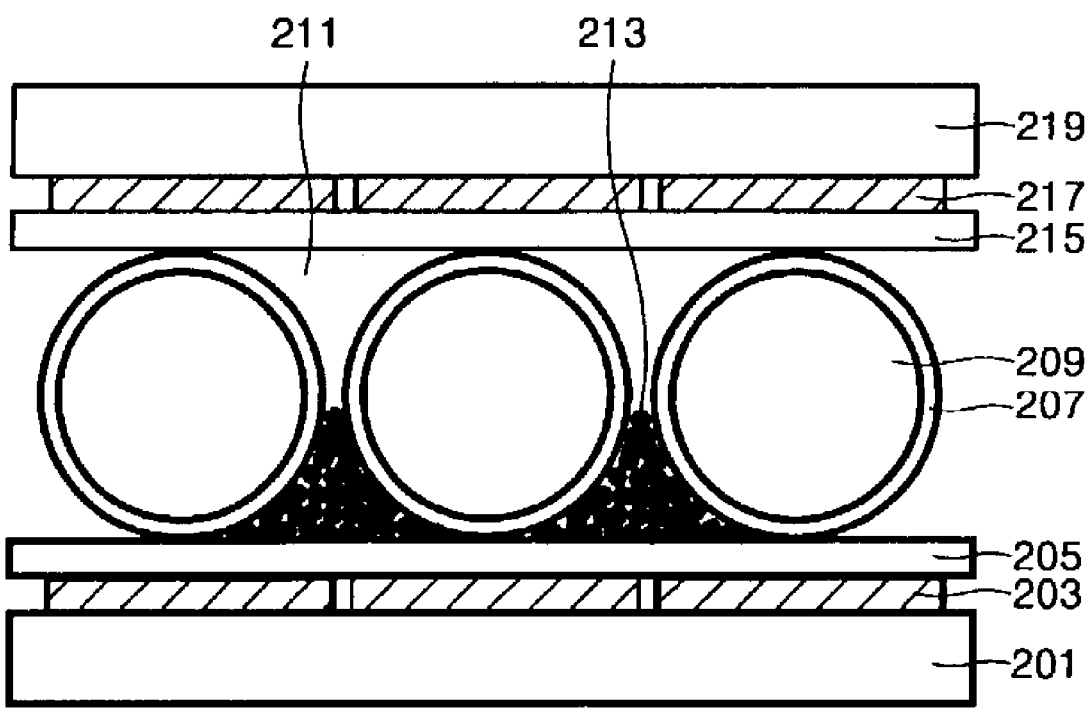
Figure 3C:
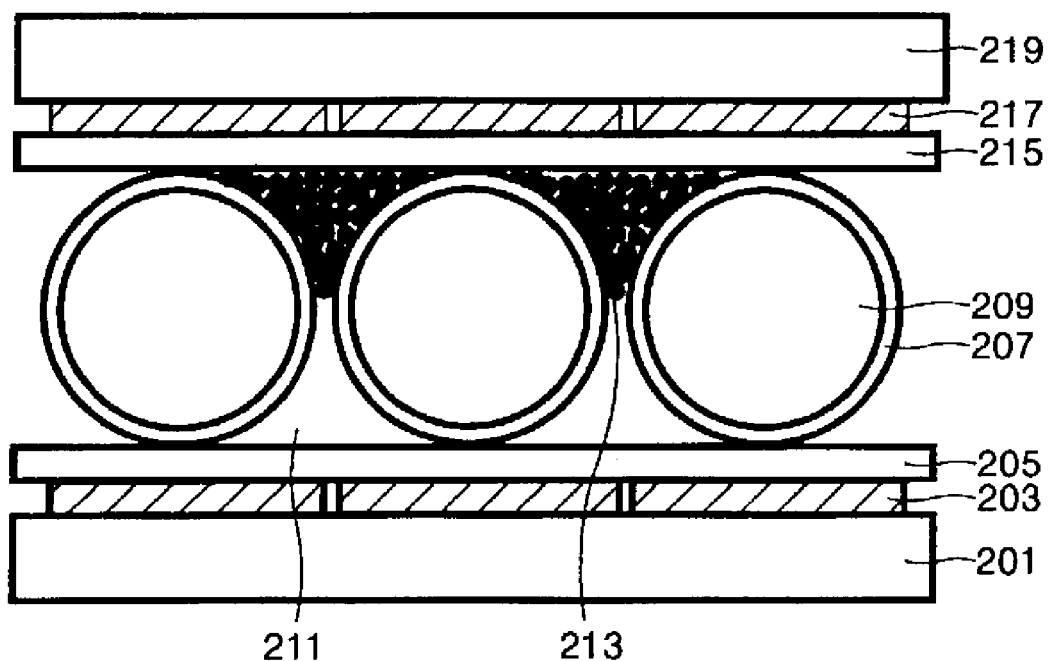

FIGS. 3A to 3C are sections of an electrophoretic display according to another embodiment of the present invention. In particular, FIGS. 3A to 3C are views of an example of the electrophoretic display operating in a pixel type.

FIG. 3A illustrates an electrophoretic display according to another embodiment of the present invention when an electric field is not applied. A lower electrode 203 in a form of pixel and an lower electrode protection layer 205 in a form of pixel are formed on a under layer 201. A plurality of microcapsules 207 are formed on the lower electrode protection layer 205, in which the microcapsules 207 are coated or encapsulated in a micro size and which do not operate according to the electric field.

A micro particle or a fluid 209 is included within the microcapsule 207, where the micro particle has one visual color and a micro size. When the micro particle 209 is included within the microcapsule 207, it is nearly the same size as the microcapsule 207. A micro particle or a fluid 209 is composed of substance absorbing or scattering lights visually. The lower electrode protection layer 205 has functions of protecting the lower electrode 203, separating the lower electrode 203 from the microcapsule 207, and preventing the charged particles from sticking to the lower electrode 203.

A dielectric fluid 211 and a charged particle 213 exist among the microcapsules 207 and a charged particle 213 is suspended in the dielectric fluid 211 in which the charged particle 113 has a different color and operates according to the electric field. The charged particle 113 is composed of particles absorbing or scattering lights. The charged particle 113 may be comprised of substances having the same specific gravity as a specific gravity of the dielectric fluid 112.

In addition, an upper electrode protection layer 215 and an upper electrode 217 are located on the microcapsules 207 in sequential order. When an electric field is applied between a lower electrode 203 and an upper electrode 217, the charged particles 213 migrate toward an electrode of opposite sign. The upper electrode protection layer 115 has functions of protecting the upper electrode 117, separating the upper electrode 117 from the microcapsule 107, and preventing the charged particles from sticking to the electrode. A transparent upper layer 119 is formed on the upper electrode 117.

FIGS. 3B and 3C illustrate an electrophoretic display according to another embodiment of the present invention when an electric field is applied. The charged particles 213 among the microcapsules 207 migrate toward electrodes of opposite sign, thereby producing a visually observable color change. FIG. 3B shows a migration of the charged particles 213 of a micro size toward the lower electrode 203, while FIG. 3C shows a migration of the charged particles 213 of a micro size toward the upper electrode 217.

Also, the electrophoretic display according to another embodiment of the present invention produces natural colors. In other words, the natural colors are achieved by having a particle or a fluid 209 of a single visual color comprised of red, green, and blue particles within the microcapsule 207, and making the particles scatter or absorb a specific color.

Figure 4A:
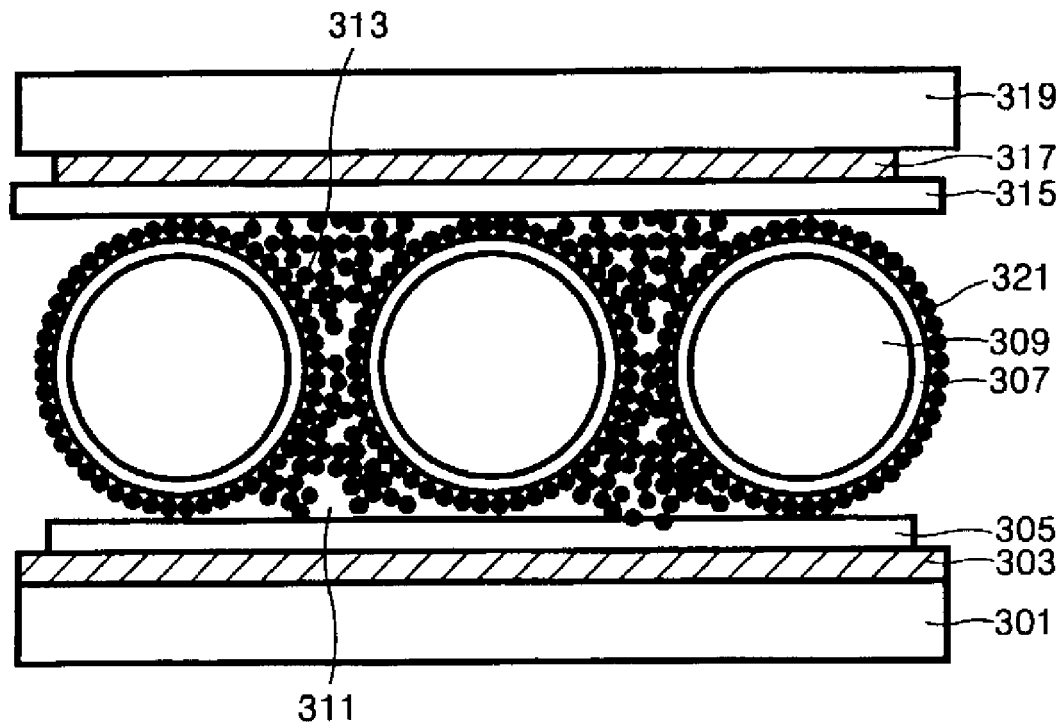
FIGS. 4A to 4C are sections of an electrophoretic display according to a preferred embodiment of the present invention.
Figure 4B:
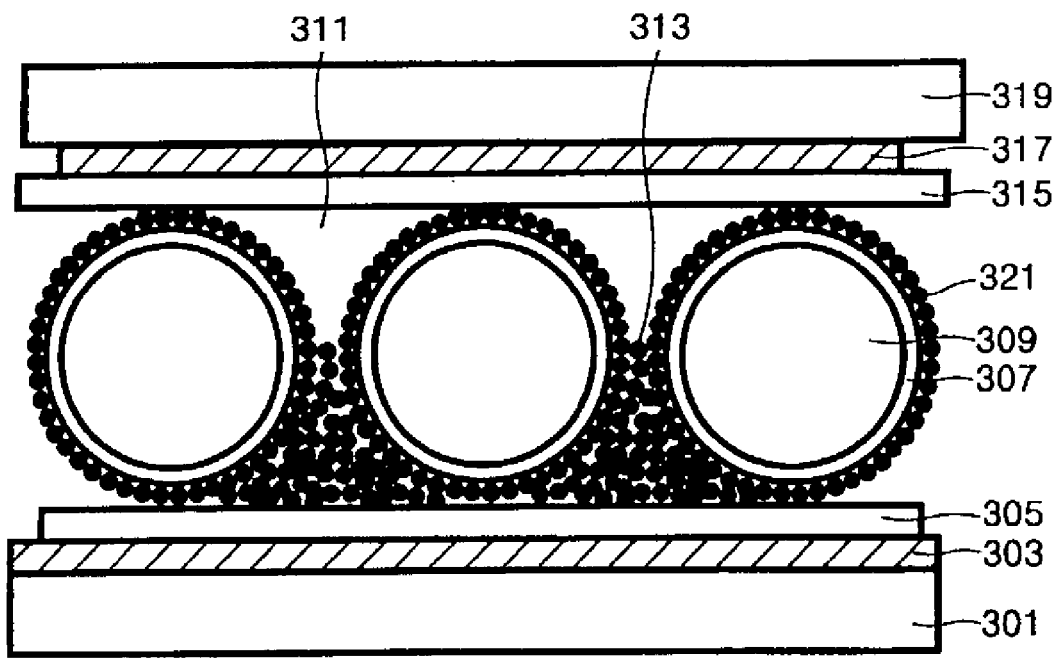
Figure 4C:
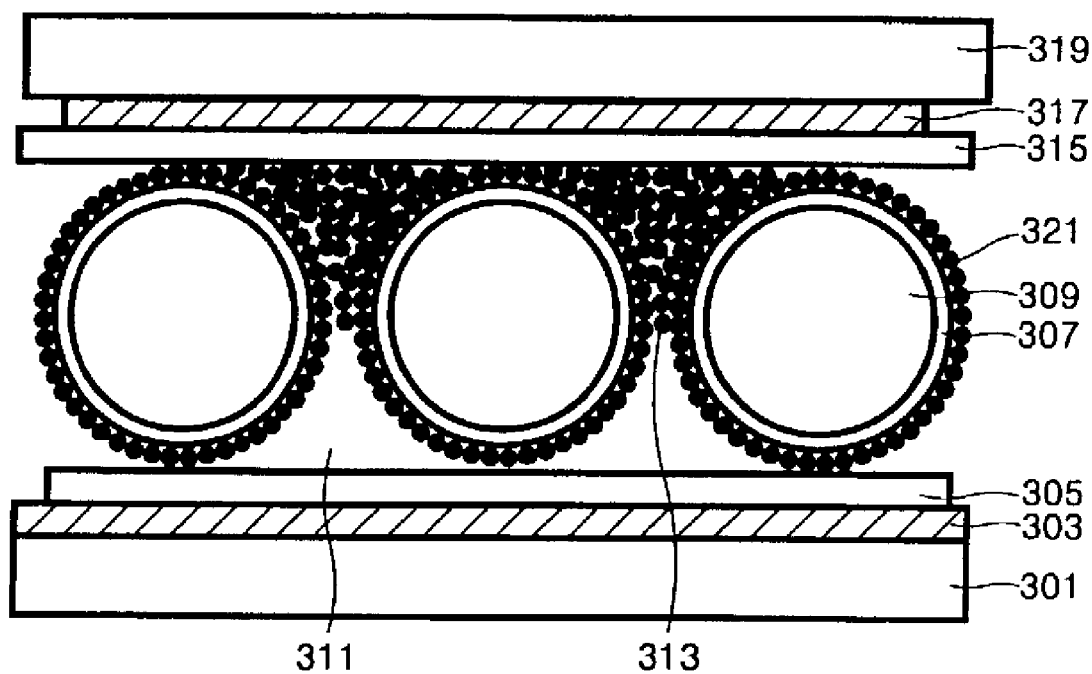

FIGS. 4A to 4C are sections of an electrophoretic display according to still another embodiment of the present invention.

FIG. 4A illustrates an electrophoretic display according to the still another embodiment of the present invention when an electric field is not applied. A lower electrode 303 and an lower electrode protection layer 305 are formed on a under layer 301. A plurality of microcapsules 307 are formed on the lower electrode protection layer 305, in which the microcapsules 307 are coated or encapsulated in a micro size, and which do not operate according to an electric field.

A micro particle or a fluid 309 is included within the microcapsule 307. When the micro particle 309 is included within the microcapsule 307, the micro particle 309 is nearly the same size as the microcapsule 307. The micro particle or the fluid 309 is comprised of substances scattering or absorbing colors visually. The microcapsule 307 is coated with fine particles 321 having a single visual color by a dye, a pigment, or other methods. A plurality of fine particles 321 formed on the microcapsule 307 is capable of scattering lights visually. If the micro articles 321 are composed of a plurality of red, green, and blue particles and scatter a specific color, natural colors are achieved. The lower electrode protection layer 305 has functions of protecting the lower electrode 303, separating the lower electrode 303 from the microcapsule 307, and preventing the charged particles from sticking to the lower electrode 303.

A dielectric fluid 311 and a charged particle 313 are located within the microcapsule 307, in which the charged particle 313 is suspended in the dielectric fluid 311, has different visual colors and operates according to an electric field. The charged particle 313 is composed of articles absorbing or scattering lights visually. The charged particle 313 may be comprised of substances having the same specific gravity as the specific gravity of the dielectric fluid 311.

In addition, an upper electrode protection layer 315 and an upper electrode 317 are located on the microcapsule 307 in sequential order. When an electric field is applied between a lower electrode 303 and an upper electrode 317, the charged particles 313 migrate toward an electrode of opposite sign. The upper electrode protection layer 315 has functions of protecting the upper electrode 317, separating the upper electrode 317 from the microcapsule 307 and preventing the charged particles 313 from sticking to the upper electrode 317. A transparent upper layer 319 is formed on the upper electrode 317.

FIGS. 3B and 3C illustrate an electrophoretic display according to the still another embodiment of the present invention when an electric field is applied. The charged particles 313 among the microcapsules 307 migrate toward electrodes of opposite sign, thereby producing a visually observable color change. FIG. 4B shows a migration of the charged particles 313 of a micro size toward the lower electrode 303, while FIG. 4C shows a migration of the charged particles 213 of a micro size toward the upper electrode 317.

Also, the electrophoretic display according to yet another embodiment of the present invention produces natural colors. If the fine particle 321 coated on the microcapsule 307 by a dye, a pigment, or other methods is comprised of red, green and blue particles, and then make the fine particle 321 scatter or absorb a specific color, natural colors are produced.

As described above, the structure of present invention moves only one charged particle of one color, makes the structure displaying visual colors, equalizes a specific gravity of one charged particle of one color with a specific gravity of a dielectric fluid, and prevents migrations of a particle or a fluid of different color by encapsulating them within a microcapsule. As a result, the present invention is capable of solving the problems of the prior art, of a equalization of a specific gravity of two charged particles with a specific gravity of a dielectric fluid, agglomeration or clustering of charged particles and a difference in the response time between two charged particles in an applied electric field, therefore an electrophoretic display with one color or natural colors can be achieved.

While this invention has been particularly described with reference to preferred embodiments thereof, it will be understood by those skilled in the art that various changes in form and details may be made therein without departing from the spirit and scope of the invention as defined by the appended claims and equivalents thereof.

What is claimed is:

1. An electrophoretic display comprising:
    a lower electrode located on an under layer;
    a lower electrode protection layer formed on the lower electrode;
    a plurality of microcapsules located on the lower electrode protection layer, the microcapsules being coated or encapsulated;
    at least one of a particle and a fluid included within each of the plurality of microcapsules and having a single color;
    a plurality of charged particles exist outside the plurality of microcapsules, the plurality of charged particles having a different visual color than the at least one of a particle and a fluid, operating in an electric field to one of move away from and move toward the lower electrode protection layer when the electric field is applied, and suspended in a dielectric fluid; and
    an upper electrode protection layer and an upper electrode located on the plurality of microcapsules in sequential order, wherein the at least one particle and the fluid included in the plurality of microcapsules do not move one of away from and move toward the lower electrode protection layer in an electric field when the electric field is applied between the lower electrode and the upper electrode.

2. The electrophoretic display of claim 1, wherein the charged particle includes light absorbing particles.

3. The electrophoretic display of claim 1, wherein the charged particle includes light scattering particles.

4. The electrophoretic display of claim 1, wherein the fluid or the particle within the microcapsule includes light scattering substances.

5. The electrophoretic display of claim 1, wherein the fluid or the particle within the microcapsule includes light absorbing substances.

6. The electrophoretic display of claim 1, wherein the charged particle includes substances having the same specific gravity as the specific gravity of the dielectric fluid.

7. The electrophoretic display of claim 1, wherein the lower electrode and the upper electrode form a pixel type according to a microcapsule.

8. The electrophoretic display of claim 4, wherein the particle included in a microcapsule comprises a plurality of particles, each of which is substantially smaller than a microcapsule, and scatters visual light.

9. The electrophoretic display of claim 4, wherein the particle included in a microcapsule is approximately the same size as a microcapsule, and scatters visual light.

10. The electrophoretic display of claim 9, wherein a plurality of particles is further formed on the plurality of microcapsules and scatters visual light.

11. The electrophoretic display of claim 10, wherein the plurality of particles comprises red, green and blue colors, and operate to scatter a specific color.

12. The electrophoretic display of claim 4, wherein the fluid or the particle within a microcapsule comprises red, green, and blue colors, and operates to scatter a specific color.

13. The electrophoretic display of claim 5, wherein the particle included in a microcapsule comprises a plurality of particles, each of which is substantially smaller than a microcapsule, and absorbs visual light.

14. The electrophoretic display of claim 5, wherein the particle included in a microcapsule is approximately the same size as the microcapsule and absorbs visual light.

15. The electrophoretic display of claim 14, wherein a plurality of particles is further formed on a microcapsule, and absorbs visual light.

* * * * *